(12) United States Patent
Kudoh et al.

(10) Patent No.: US 7,415,841 B2
(45) Date of Patent: Aug. 26, 2008

(54) METHOD FOR PRODUCING CHEMICALLY STRENGTHENED GLASS SUBSTRATE FOR INFORMATION RECORDING MEDIUM

(75) Inventors: Yuriko Kudoh, Osaka (JP); Kazuishi Mitani, Osaka (JP); Yasuhiro Saito, Osaka (JP)

(73) Assignee: Hoya Corporation, Tokyo (JP)

( * ) Notice: Subject to any disclaimer, the term of this patent is extended or adjusted under 35 U.S.C. 154(b) by 285 days.

(21) Appl. No.: 10/397,196

(22) Filed: Mar. 27, 2003

(65) Prior Publication Data
US 2003/0192348 A1 Oct. 16, 2003

(30) Foreign Application Priority Data
Mar. 27, 2002 (JP) ............... P. 2002-089719

(51) Int. Cl.
*C03C 21/00* (2006.01)
(52) U.S. Cl. ..................... 65/30.14; 65/30.1
(58) Field of Classification Search ............. 65/30.13, 65/30.14, 60.5, 60.53, 30.1; 134/3
See application file for complete search history.

(56) References Cited

U.S. PATENT DOCUMENTS

| 3,674,453 | A | * | 7/1972 | Loukes et al. ............... 65/30.13 |
| 4,021,218 | A | * | 5/1977 | Watanabe .................. 65/30.14 |
| 5,156,884 | A | * | 10/1992 | Tanitsu et al. ............... 427/558 |
| 6,119,483 | A | * | 9/2000 | Takahashi et al. ........... 65/30.14 |
| 6,402,851 | B1 | * | 6/2002 | Piltingsrud ..................... 134/1 |
| 6,440,505 | B1 | * | 8/2002 | Raina .......................... 427/579 |
| 2002/0000098 | A1 | * | 1/2002 | Fujimura et al. ........... 65/30.14 |

FOREIGN PATENT DOCUMENTS

| JP | 57149850 A | * | 9/1982 |
| JP | 04117624 A | * | 4/1992 |

* cited by examiner

*Primary Examiner*—Steven P. Griffin
*Assistant Examiner*—Queenie Dehghan
(74) *Attorney, Agent, or Firm*—Sughrue Mion, PLLC

(57) ABSTRACT

Prior to conducting chemical strengthening treatment by contacting a glass with a potassium-containing chemical strengthening treating solution, oxidation treatment is conducted to iron-containing particles adhered to a surface of the glass as a pre-step, and the glass is then chemically strengthened. The oxidation treatment is a heat treatment conducted at 80-400° C. in the air. A glass substrate for an information recording medium is obtained by the method.

12 Claims, No Drawings

METHOD FOR PRODUCING CHEMICALLY STRENGTHENED GLASS SUBSTRATE FOR INFORMATION RECORDING MEDIUM

FIELD OF THE INVENTION

The present invention relates to a method for producing a chemically strengthened glass, a method for producing a chemically strengthened glass substrate, a method for producing a glass substrate for information recording medium, and a glass substrate for information recording medium obtained by the method.

DESCRIPTION OF THE RELATED ART

Strengthened glass used for electrical appliances represented by information processing instruments calls for high cleanliness. In particular, a chemically strengthened glass substrate for a magnetic disk requires a substrate excellent in smoothness. With an increase of the information packing density of a magnetic disk memory device, decrease in the flying of a magnetic head has been intended. In order to decrease the flying height of the magnetic head, a chemically strengthened glass substrate for a magnetic disk excellent in smoothness on a surface of which no projected protrusion exists is required. A product obtained by forming an information recording film having magnetic characteristics on the chemically strengthened glass substrate for a magnetic disk are used as an information recording medium. In order to increase the density of information recording, it is necessary to decrease the spacing (flying height) between the magnetic head and the information recording medium.

In a hard disk, the presence of protrusions existing on a surface of a glass substrate contributes to the collision between the glass substrate and the magnetic head. The protrusions are formed due to foreign matter adhering to the surface of the glass substrate. As for methods for removing foreign matter on the glass substrate, investigations have hitherto been made. However, with the progress of a decrease in flying height, requirements for smoothness have become severe, and minute foreign matter which has hitherto counted for nothing has also come to be considered as the cause of a defect.

As the kind of foreign matter on the glass substrate, there are metal-containing particles such as minute iron particles and stainless steel pieces. When chemical strengthening treatment is conducted with the particles such as iron particles adhering to the glass substrate, or with the particles such as iron particles existing in a chemical strengthening treating solution, it has been known that the iron particles are firmly fixed to the glass substrate by oxidation reaction which occurs in a chemical strengthening process and heating action to form projections (JP-A-2001-006168).

When a thin film such as a magnetic film is coated on the glass substrate to which such iron particles adhered, projections are formed to cause a defect. However, when general glass cleaning methods presently known are used, it has been found that the removal of the above-mentioned projections by cleaning after the chemical strengthening process is difficult. Accordingly, in order to inhibit the projection formation, it is necessary to inhibit the adhesion of the particles before and during the chemical strengthening process.

As the former methods, there are proposed methods of conducting the chemical strengthening process in a clean room in order to remove iron foreign matter from an atmosphere in a chemical strengthening room (JP-A-10-19785, 2001-072444 and 2001-250226).

Further, as the latter methods, there are proposed methods of using strengthening salts whose iron particle content is decreased by filtering or the like in order to remove iron particles contained in chemical strengthening salts (JP-A-10-194786, 2000-203888 and 2001-006168), methods of using glass holding fixtures low in dust generation, methods of using strengthened tanks low in dust generation (JP-A-11-025454, 2001-195728, 07-232935 and 10-198954 and the like.

However, in any of the methods, it is impossible to completely remove the particles, and there is the problem that the particles which slightly remain cause the defect. Further, there is the problem that any of the methods necessitate complicated facilities, resulting in high cost.

There is the problem that particles (fine particles) such as iron particles which adhere to a glass surface before chemical strengthening treatment or particles such as iron particles contained in a chemical strengthening solution (molten salt) firmly adhere to the glass surface during chemical strengthening based on ion exchange to deteriorate surface cleanliness, which forms protrusions contributing to a product defect.

This problem is a technical problem having high necessity to be solved, particularly in a glass substrate for a magnetic recording medium in which high surface cleanliness is required.

SUMMARY OF THE INVENTION

Accordingly, one object of the invention is to provide a method for producing a chemically strengthened glass comprising inhibiting the adhesion of particles such as iron particles to a glass surface during chemical strengthening treatment.

Another object of the invention is to provide a method for producing a chemically strengthened glass substrate.

Still another object of the invention is to provide a method for producing a glass substrate for information recording medium.

Further object of the invention is to provide a glass substrate for an information recording medium obtained by the method.

It has been found that iron particles adhering to a glass surface before the chemical strengthening treatment or iron particles contained in a chemically strengthening salt firmly adhere to the glass surface during the chemical strengthening treatment process to cause the defect, but when iron particles oxidized before the chemical strengthening treatment adheres, or when only oxidized iron particles are contained in the chemically strengthening salt, the firm adhesion does not occur during the chemical strengthening process to inhibit the formation of protrusions.

The method for producing chemically strengthened glass comprises contacting a glass with a potassium-containing chemical strengthening treating solution, wherein oxidation treatment is conducted to metal-containing particles adhered to a surface of the glass as a pre-step for the chemical strengthening treatment, and the glass is then subjected to the chemical strengthening.

The method for producing a chemically strengthened glass substrate comprises the steps of:

(a) oxidizing metal-containing particles adhered to a surface of the glass substrate;

(b) contacting the glass substrate with a potassium-containing chemical strengthening solution; and (c) removing the oxidized particles from the glass substrate by cleaning, thereby improving the cleanliness of the glass substrate.

The method for producing a glass substrate for information recording medium comprises the steps of:

(a) processing a plate-like glass substrate in a doughnut shape;

(b) grinding the doughnut-shaped glass substrate to smoothen a surface thereof;

(c) heating the glass substrate to a predetermined temperature; and (d) contacting the glass substrate with a potassium-containing chemical strengthening treating solution.

DETAILED DESCRIPTION OF THE INVENTION

The invention is described in detail below.

There is no particular limitation on the composition of glass used in the invention. The glass includes, for example, crystallized glasses such as $Li_2O$—$SiO_2$-based glass containing lithium oxide and silicon dioxide as main components, $Li_2O$—$Al_2O_3$—$SiO_2$-based glass containing lithium oxide, silicon dioxide and aluminum oxide as main components, RO—$Al_2O_3$—$SiO_2$-based glass containing an alkaline earth metal oxide, etc., aluminum oxide and silicon dioxide as main components (wherein RO is magnesium oxide MgO, calcium oxide CaO, strontium oxide SrO, barium oxide BaO, zinc oxide ZnO, nickel oxide NiO, manganese oxide MnO or the like) and the like, as well as soda lime glasses containing silicon dioxide, an alkali metal oxide and an alkaline earth metal oxide as main components, aluminosilicate glass containing silicon dioxide, aluminum oxide and an alkali metal oxide as main components and borosilicate glass containing silicon oxide and a boron oxide as main components.

Aluminum oxide, the alkali metal oxide and the alkaline earth metal oxide are components easily soluble in an acid aqueous solution, and glasses containing those components to some extent are relatively easily etched. Such glass substrates include, for example, aluminosilicate-based glass indicated by the content of the following composition components. The "%" hereinafter means "mol %", unless otherwise specified.

Silicon dioxide ($SiO_2$): 55 to 70%;
Aluminum oxide ($Al_2O_3$): 1 to 12.5%;
Lithium oxide ($Li_2O$): 5 to 20%;
Sodium oxide ($Na_2O$): 0 to 14%;
Potassium oxide ($K_2O$): 0 to 3%;
Magnesium oxide (MgO): 0 to 8%;
Calcium oxide (CaO): 0 to 10%;
Strontium oxide (SrO): 0 to 6%;
Barium oxide (BaO): 0 to 2%;
Titanium dioxide ($TiO_2$): 0 to 8%; and
Zirconium oxide ($ZrO_2$): 0 to 4%.

In the invention, there is no particular limitation on a process of molding a glass, and there can be used any process of a down draw process, a redraw process, a press process and the like, as well as a float process. The glass substrate formed in a plate-like shape is processed in a doughnut shape with a cemented carbide (hard metal) or diamond cutter. There is no particular limitation on a method for obtaining the doughnut-shaped glass plate. First, a disk having the desired outer diameter may be cut, and then an inner part corresponding to the desired inner diameter may be cut with a cylindrical diamond grindstone. Alternatively, a disk having the desired outer diameter may be prepared by the press method, and then an inner hole corresponding to the desired inner diameter may be formed with a diamond grinding wheel.

In order to accurately fit the dimensions of the outer diameter and inner diameter of the doughnut-shaped glass substrate to the dimensions of a product, grinding is carried out to inside and outside peripheries. There is also no particular limitation of the grinding method. Usually, the grinding is carried out using a grinding wheel having diamond abrasive grains adhered thereon. At the same time, chamfering of the inside and outside peripheries can be carried out with the grinding wheel which is prepared so as to give a specified shape of the product. Needless to say, the processing of edges and the chamfering may be carried out concurrently or separately. After this grinding, the edges and the chamfered faces may further be polished with a cerium-containing abrasive in order to smoothen the roughness of the edges and the chamfered faces.

If required and necessary, prior to the polishing treatment described above, lapping treatment may be carried out using alumina abrasive grains or the like in order to make the thickness of glass uniform or to remove defects on a surface of glass. The lapping treatment may be carried out before the processing of edges and the chamfering, or first lapping may be carried out before the processing of edges and the chamfering and second grinding may be carried out after the processing of edges and the chamfering.

After the smoothening treatment as described above, cleaning is carried out in order to remove a slurry and the like adhered. There is no particular limitation on the cleaning method. However, it is preferred that not only simple cleaning is carried out with only water and a detergent, but also mechanical removal of adhered matters is carried out by rubbing the surface with a soft plastic pad or precise cleaning is carried out, while applying an ultrasonic wave, in an appropriate combination of an acidic aqueous solution, an alkaline aqueous solution and pure water, because when an abrasive remains, it adheres to the surface in the subsequent chemical strengthening process, which makes it difficult to remove it.

Chemical strengthening is then conducted to increase the reliability to mechanical shock in handling the substrate, to thermal shock when the film of magnetic recording material (medium) being coated on the substrate, or in the long-term use after integration into a hard disk drive. For example, the glass substrate is immersed for several hours in a mixed salt of potassium nitrate and sodium nitrate heated at a temperature of about 400° C. to a molten state to ion exchange lithium and sodium of the glass components for potassium in the strengthening salt up to the depth of about 100 μm from the surface of the glass substrate, thereby being able to obtain the mechanical strength required for the magnetic disk substrate. The strengthening salts of potassium nitrate and sodium nitrate remaining on the surface can be dissolved by immersing the substrate in hot water at 50 to 80° C. for about 1 hour. A single salt of potassium nitrate can be used as the strengthening salt.

In the invention, oxidation treatment is conducted to iron particles adhered to the glass substrate as a pre-step for the chemical strengthening treatment described above. The oxidation treatment is conducted by heating the iron particles in an oxidation atmosphere. The iron particles on the glass substrate can be oxidized by heating the glass substrate. The iron particles as used herein include iron particles of all forms which can exist in the air, such as iron-containing mineral particles and iron rust particles contained in the air such as $Fe_3O_4$, $Fe_2O_3$, $Fe(OH)_3$, FeO(OH) and $FeCO_3$. The firm adhesion of the iron particles to the glass in the strengthening process can be prevented by conducting the oxidation treatment of the iron particles before the strengthening process.

It is preferable to conduct heating of the glass substrate within the temperature range of 80-400° C. When the heating temperature of the glass substrate is lower than 80° C., the iron particles are not sufficiently oxidized. Accordingly, the sufficient effect of preventing iron adhesion is not obtained. On the other hand, exceeding 400° C. results in the occurrence of firm fixing reaction between the iron particles and the glass surface only by heating for about 2 to 3 minutes. The heating temperature of the glass substrate is therefore preferably 80-400° C. The more preferred lower limit value is 100° C. or more, and the more preferred upper limit value is 350° C. or less.

The heating time is preferably within the range of exceeding 20 minutes to 10 hours. When the heating time is 20 minutes or less, the iron particles are not sufficiently oxidized. On the other hand, when the heating time exceeds 10 hours, the iron particles firmly adhere to the surface of the glass substrate between the surface of the glass substrate and the iron particles. Accordingly, the heating time of the glass substrate is preferably from exceeding 20 minutes to 10 hours. The more preferred lower limit value is 2 hours or more, and the more preferred upper limit value is 4 hours or less.

There is no particular limitation on the oxidizing method of the iron particles adhered to the surface of the glass substrate, and it is usually conducted in the air. Ozone oxidation, ashing treatment and oxidation treatment in which ultraviolet ray irradiation is conducted in the presence of oxygen can be used.

When the chemical strengthening treating solution is preheated at a temperature within the range from exceeding 300° C. to 450° C. for 20 minutes or more before the glass substrate is immersed in the chemical strengthening treating solution, the iron particles in the chemical strengthening treating solution are oxidized, so that the effect of preventing iron particle adhesion is more enhanced. If the preheating is conducted at a temperature lower than 300° C., in the case where, for example, nitrates in the molten state are used as the chemical strengthening treating solution, such a preheating temperature is lower than the melting point of the nitrates or less, whereas the preheating temperature exceeding 450° C. results in the occurrence of decomposition of the molten salts. The heating temperature is therefore preferably from exceeding 300° C. to 450° C., and more preferably 360-400° C. The heating time is 20 minutes or more, and preferably 1 hour or more.

Oxidation of the iron particles can be enhanced to obtain the greater preventing effect by adding an oxidizing agent to the chemical strengthening treating solution and heating the resulting solution. The oxidizing agent added to the chemical strengthening treating solution may be any material so long as it is a material generally used as the oxidizing agent. Further, there is no particular limitation on the oxidizing method of the iron particles contained in the strengthening salt, and bubbling of carbon dioxide, electrolytic oxidation and the like may be used.

Although the firm adhesion of the iron particles to the glass surface is inhibited by the above-described oxidation treatment of the iron particles, it is possible to more effectively remove the iron particles adhered to the glass surface by conducting cleaning with an acid-containing cleaning solution or ultrasonic cleaning with an acid-containing cleaning solution. Cleaning using an acidic solution containing a reducing agent is preferable. Cleaning using an acidic solution containing a reducing agent and a chelating agent is more preferable.

As the cleaning solution, any solution can be used so long as it is an acidic cleaning solution generally used for cleaning of glass. Hydrofluoric acid, hydrochloric acid, nitric acid, sulfuric acid, a mixed acid obtained by arbitrarily mixing these inorganic acids, any one of L-ascorbic acid, malonic acid and oxalic acid, or a cleaning solution obtained by combining these is preferably used. Malonic acid, a mixed acid of sulfuric acid and nitric acid, or a mixed solution of malonic acid, sulfuric acid and nitric acid is more preferably used. Further, any additives such as a surfactant, a chelating agent or an organic solvent can be added so long as it is one generally used for cleaning of glass. Preferably, a reducing agent is added. More preferably, a reducing agent and a chelating agent are added. The reducing agent may be any material so long as it is a conventional material having the reducing action. Preferably, L-ascorbic acid or oxalic acid is used. The chelating agent may be any material so long as it is a conventional material having the chelating action. Preferably, HEDTA (N-(2-hydroxyethyl)ethylenediaminetriacetic acid) or oxalic acid is used.

After the acid cleaning, cleaning such as ultrasonic cleaning using an acid or an alkali, tape cleaning or brush scrub can also be further conducted if required and necessary. There is no particular limitation on the material of a sponge used in scrub cleaning, and the scrub conditions such as pressure or the number of revolution of the substrate in scrubbing. Those can be selected according to the degree of residual contaminants.

Further, the application of the ultrasonic cleaning after the scrub cleaning is preferred, because foreign matter relatively weak in adherence such as general foreign matter other than abrasive grains, for example, turnings produced by the tape or scrub cleaning, can be completely removed, in addition to the foreign matter once removed by the tape or scrub cleaning. As the cleaning solution, any solution can be used so long as it is one generally used for cleaning of glass, such as an acidic solution, an alkaline solution, a neutral solution or an organic solvent. Further, any additives such as a surfactant, a chelating agent or an organic solvent can be added so long as it is one generally used for cleaning of glass.

There is no particular limitation on the conditions such as the frequency and output of an ultrasonic wave, the cleaning time and the cleaning temperature. In order to prevent damage, the frequency of an ultrasonic wave is usually set to 38 kHz or more, the output to 1 $W/cm^2$ or less, the cleaning time to 2 to 20 minutes, and the solution temperature to 70° C. or lower. After the ultrasonic cleaning, rinsing is conducted with pure water, followed by drying. There is no particular limitation on the rinsing method. In addition to immersion or immersion with an ultrasonic wave applied, methods such as showering and spraying can be applied. Further, there is also no particular limitation on the drying method, and any methods such as spin drying and IPA (isopropyl alcohol) drying can be applied so long as they can comply with precise cleaning of this kind.

The present invention is described in more detail by reference to the following Examples, but it should be understood that the invention is not construed as being limited thereto.

EXAMPLE 1

Smoothing treatment was carried out to a substrate obtained by carrying out chamfering and lapping to doughnut-shaped aminosilicate-based glass ($SiO_2$: 6.0 mol %, $Al_2O_3$: 11.0 mol %, $Li_2O$: 8.0 mol %, $Na_2O$: 9.1 mol %, MgO: 2.4 mol %, CaO: 3.6 mol %) having a thickness of 0.6 mm, an outer diameter of 65 mm and an inner diameter of 20 mm. The smoothing treatment was carried out by polishing both faces using a cerium oxide-containing abrasive and polishing pads having an Asker C (according to the standard of Japan Rubber Association) hardness of 70. Abrasive adhered to a surface of the substrate was removed by scrubbing with sponge made from polyvinyl alcohol and ultrasonic cleaning using an strong alkali, followed by rinsing with pure water. The substrate was dried in IPA vapor for 1 minute.

The resulting glass substrate was exposed in an atmosphere containing 20.2 µg/m$^3$ of suspended iron particulates for 20 days. Using a defect detector (RS7000 manufactured by Hitachi DECO), the average number of defects per µm square on the surface of the glass substrate exposed was examined. As a result, it was 12. The number of particles per µm square on the surface of the glass substrate not exposed was 0 to 1 on the average. Further analysis of the exposed glass substrate with a total reflection X-ray fluorescence apparatus gave the result that the amount of Fe was evidently rich. It was therefore presumed that all particles detected with the defect detector were iron particles.

After the exposed glass substrate was heated at 80° C. for 30 minutes, the substrate was immersed for 4 hours in a mixed molten salt of potassium nitrate (80% by weight) and sodium nitrate (20% by weight) heated at 350° C., thereby conducting the chemical strengthening treatment of ion exchanging lithium ions and sodium ions in the glass substrate for potassium ions having an ion radius smaller than their ion radius. After the chemical strengthening treatment, the substrate was cleaned with pure water to remove the molten salt. Cleaning was then conducted with a mixed acid of nitric acid and sulfuric acid, pure water, an alkali cleaning solution and pure water in this order.

Using the defect detector, 100 sheets of the above substrates were inspected, and the average number of defects per µm square per sheet was examined. The results obtained are shown in Table 1 below.

EXAMPLE 2

For a glass substrate obtained in the same manner as in Example 1 with the exception that heating of the substrate was conducted at 80° C. for 2 hours, the average number of defects was similarly examined. The results obtained are shown in Table 1 below.

EXAMPLE 3

For a glass substrate obtained in the same manner as in Example 1 with the exception that heating of the substrate was conducted at 80° C. for 4 hours, the average number of defects was similarly examined. The results are shown in Table 1 below.

EXAMPLE 4

For a glass substrate obtained in the same manner as in Example 1 with the exception that heating of the substrate was conducted at 80° C. for 8 hours, the average number of defects was similarly examined. The results obtained are shown in Table 1 below.

EXAMPLE 5

For a glass substrate obtained in the same manner as in Example 1 with the exception that heating of the substrate was conducted at 80° C. for 10 hours, the average number of defects was similarly examined. The results obtained are shown in Table 1 below.

EXAMPLE 6

For a glass substrate obtained in the same manner as in Example 1 with the exception that heating of the substrate was conducted at 200° C. for 30 minutes, the average number of defects was similarly examined. The results obtained are shown in Table 1 below.

EXAMPLE 7

For a glass substrate obtained in the same manner as in Example 1 with the exception that heating of the substrate was conducted at 200° C. for 2 hours, the average number of defects was similarly examined. The results obtained are shown in Table 1 below.

EXAMPLE 8

For a glass substrate obtained in the same manner as in Example 1 with the exception that heating of the substrate was conducted at 200° C. for 4 hours, the average number of defects was similarly examined. The results obtained are shown in Table 1 below.

EXAMPLE 9

For a glass substrate obtained in the same manner as in Example 1 with the exception that heating of the substrate was conducted at 200° C. for 8 hours, the average number of defects was similarly examined. The results obtained are shown in Table 1 below.

EXAMPLE 10

For a glass substrate obtained in the same manner as in Example 1 with the exception that heating of the substrate was conducted at 200° C. for 10 hours, the average number of defects was similarly examined. The results obtained are shown in Table 1 below.

EXAMPLE 11

For a glass substrate obtained in the same manner as in Example 1 with the exception that heating of the substrate was conducted at 300° C. for 30 minutes, the average number of defects was similarly examined. The results obtained are shown in Table 1 below.

EXAMPLE 12

For a glass substrate obtained in the same manner as in Example 1 with the exception that heating of the substrate was conducted at 300° C. for 2 hours, the average number of defects was similarly examined. The results obtained are shown in Table 1 below.

EXAMPLE 13

For a glass substrate obtained in the same manner as in Example 1 with the exception that heating of the substrate was conducted at 300° C. for 4 hours, the average number of defects was similarly examined. The results obtained are shown in Table 1 below.

EXAMPLE 14

For a glass substrate obtained in the same manner as in Example 1 with the exception that heating of the substrate was conducted at 300° C. for 8 hours, the average number of defects was similarly examined. The results obtained are shown in Table 1 below.

EXAMPLE 15

For a glass substrate obtained in the same manner as in Example 1 with the exception that heating of the substrate was conducted at 300° C. for 10 hours, the average number of defects was similarly examined. The results obtained are shown in Table 1 below.

EXAMPLE 16

For a glass substrate obtained in the same manner as in Example 1 with the exception that heating of the substrate was conducted at 400° C. for 30 minutes, the average number of defects was similarly examined. The results obtained are shown in Table 1 below.

EXAMPLE 17

For a glass substrate obtained in the same manner as in Example 1 with the exception that heating of the substrate was conducted at 400° C. for 2 hours, the average number of defects was similarly examined. The results obtained are shown in Table 1 below.

EXAMPLE 18

For a glass substrate obtained in the same manner as in Example 1 with the exception that heating of the substrate was conducted at 400° C. for 4 hours, the average number of defects was similarly examined. The results obtained are shown in Table 1 below.

EXAMPLE 19

For a glass substrate obtained in the same manner as in Example 1 with the exception that heating of the substrate was conducted at 400° C. for 8 hours, the average number of defects was similarly examined. The results obtained are shown in Table 1 below.

EXAMPLE 20

For a glass substrate obtained in the same manner as in Example 1 with the exception that heating of the substrate was conducted at 400° C. for 10 hours, the average number of defects was similarly examined. The results obtained are shown in Table 1 below.

TABLE 1

|  | Oxidation Treatment Temperature | Oxidation Treatment Time | Number of Defects |
| --- | --- | --- | --- |
| Example 1 | 80° C. | 30 minutes | 5 |
| Example 2 | 80° C. | 2 hours | 5 |
| Example 3 | 80° C. | 4 hours | 1 |
| Example 4 | 80° C. | 8 hours | 4 |
| Example 5 | 80° C. | 10 hours | 3 |
| Example 6 | 200° C. | 30 minutes | 5 |
| Example 7 | 200° C. | 2 hours | 1 |
| Example 8 | 200° C. | 4 hours | 2 |
| Example 9 | 200° C. | 8 hours | 3 |
| Example 10 | 200° C. | 10 hours | 3 |
| Example 11 | 300° C. | 30 minutes | 3 |
| Example 12 | 300° C. | 2 hours | 1 |
| Example 13 | 300° C. | 4 hours | 1 |
| Example 14 | 300° C. | 8 hours | 3 |
| Example 15 | 300° C. | 10 hours | 4 |
| Example 16 | 400° C. | 30 minutes | 4 |
| Example 17 | 400° C. | 2 hours | 4 |
| Example 18 | 400° C. | 4 hours | 3 |
| Example 19 | 400° C. | 8 hours | 5 |
| Example 20 | 400° C. | 10 hours | 5 |

COMPARATIVE EXAMPLE 1

For a glass substrate obtained in the same manner as in Example 1 with the exception that the heating time of the substrate was 0 hour (heating treatment as a pre-process for strengthening treatment was not conducted), the average number of defects was similarly examined. The results obtained are shown in Table 2 below.

COMPARATIVE EXAMPLE 2

For a glass substrate obtained in the same manner as in Example 1 with the exception that heating of the substrate was conducted at 50° C. for 10 minutes, the average number of defects was similarly examined. The results obtained are shown in Table 2 below.

COMPARATIVE EXAMPLE 3

For a glass substrate obtained in the same manner as in Example 1 with the exception that heating of the substrate was conducted at 50° C. for 30 minutes, the average number of defects was similarly examined. The results obtained are shown in Table 2 below.

COMPARATIVE EXAMPLE 4

For a glass substrate obtained in the same manner as in Example 1 with the exception that heating of the substrate was conducted at 50° C. for 2 hours, the average number of defects was similarly examined. The results obtained are shown in Table 2 below.

COMPARATIVE EXAMPLE 5

For a glass substrate obtained in the same manner as in Example 1 with the exception that heating of the substrate was conducted at 50° C. for 4 hours, the average number of defects was similarly examined. The results obtained are shown in Table 2 below.

COMPARATIVE EXAMPLE 6

For a glass substrate obtained in the same manner as in Example 1 with the exception that heating of the substrate was conducted at 50° C. for 8 hours, the average number of defects was similarly examined. The results obtained are shown in Table 2 below.

COMPARATIVE EXAMPLE 7

For a glass substrate obtained in the same manner as in Example 1 with the exception that heating of the substrate was conducted at 50° C. for 10 hours, the average number of defects was similarly examined. The results obtained are shown in Table 2 below.

COMPARATIVE EXAMPLE 8

For a glass substrate obtained in the same manner as in Example 1 with the exception that heating of the substrate was conducted at 50° C. for 12 hours, the average number of defects was similarly examined. The results obtained are shown in Table 2 below.

COMPARATIVE EXAMPLE 9

For a glass substrate obtained in the same manner as in Example 1 with the exception that heating of the substrate was conducted at 80° C. for 10 minutes, the average number of defects was similarly examined. The results obtained are shown in Table 2 below.

COMPARATIVE EXAMPLE 10

For a glass substrate obtained in the same manner as in Example 1 with the exception that heating of the substrate was conducted at 80° C. for 12 hours, the average number of defects was similarly examined. The results obtained are shown in Table 2 below.

COMPARATIVE EXAMPLE 11

For a glass substrate obtained in the same manner as in Example 1 with the exception that heating of the substrate was conducted at 200° C. for 10 minutes, the average number of defects was similarly examined. The results obtained are shown in Table 2 below.

COMPARATIVE EXAMPLE 12

For a glass substrate obtained in the same manner as in Example 1 with the exception that heating of the substrate was conducted at 200° C. for 12 hours, the average number of defects was similarly examined. The results obtained are shown in Table 2 below.

COMPARATIVE EXAMPLE 13

For a glass substrate obtained in the same manner as in Example 1 with the exception that heating of the substrate was conducted at 300° C. for 10 minutes, the average number of defects was similarly examined. The results obtained are shown in Table 2 below.

COMPARATIVE EXAMPLE 14

For a glass substrate obtained in the same manner as in Example 1 with the exception that heating of the substrate was conducted at 300° C. for 12 hours, the average number of defects was similarly examined. The results obtained are shown in Table 2 below.

COMPARATIVE EXAMPLE 15

For a glass substrate obtained in the same manner as in Example 1 with the exception that heating of the substrate was conducted at 400° C. for 10 minutes, the average number of defects was similarly examined. The results obtained are shown in Table 2 below.

COMPARATIVE EXAMPLE 16

For a glass substrate obtained in the same manner as in Example 1 with the exception that heating of the substrate was conducted at 400° C. for 12 hours, the average number of defects was similarly examined. The results obtained are shown in Table 2 below.

COMPARATIVE EXAMPLE 17

For a glass substrate obtained in the same manner as in example 1 with the exception that heating of the substrate was conducted at 420° C. for 10 minutes, the average number of defects was similarly examined. The results obtained are shown in Table 2 below.

COMPARATIVE EXAMPLE 18

For a glass substrate obtained in the same manner as in Example 1 with the exception that heating of the substrate was conducted at 420° C. for 30 minutes, the average number of defects was similarly examined. The results obtained are shown in Table 2 below.

COMPARATIVE EXAMPLE 19

For a glass substrate obtained in the same manner as in Example 1 with the exception that heating of the substrate was conducted at 420° C. for 2 hours, the average number of defects was similarly examined. The results obtained are shown in Table 2 below.

COMPARATIVE EXAMPLE 20

For a glass substrate obtained in the same manner as in Example 1 with the exception that heating of the substrate was conducted at 420° C. for 4 hours, the average number of defects was similarly examined. The results obtained are shown in Table 2 below.

COMPARATIVE EXAMPLE 21

For a glass substrate obtained in the same manner as in Example 1 with the exception that heating of the substrate was conducted at 420° C. for 8 hours, the average number of defects was similarly examined. The results obtained are shown in Table 2 below.

COMPARATIVE EXAMPLE 22

For a glass substrate obtained in the same manner as in Example 1 with the exception that heating of the substrate was conducted at 420° C. for 10 hours, the average number of defects was similarly examined. The results obtained are shown in Table 2 below.

COMPARATIVE EXAMPLE 23

For a glass substrate obtained in the same manner as in Example 1 with the exception that heating of the substrate was conducted at 420° C. for 12 hours, the average number of defects was similarly examined. The results obtained are shown in Table 2 below.

TABLE 2

|  | Oxidation Treatment Temperature | Oxidation Treatment Time | Number of Defects |
| --- | --- | --- | --- |
| Comparative Example 1 | Not conducted | Not conducted | 12 |
| Comparative Example 2 | 50° C. | 10 minutes | 10 |

TABLE 2-continued

|  | Oxidation Treatment Temperature | Oxidation Treatment Time | Number of Defects |
|---|---|---|---|
| Comparative Example 3 | 50° C. | 30 minutes | 11 |
| Comparative Example 4 | 50° C. | 2 hours | 8 |
| Comparative Example 5 | 50° C. | 4 hours | 9 |
| Comparative Example 6 | 50° C. | 8 hours | 8 |
| Comparative Example 7 | 50° C. | 10 hours | 10 |
| Comparative Example 8 | 50° C. | 12 hours | 9 |
| Comparative Example 9 | 80° C. | 10 minutes | 10 |
| Comparative Example 10 | 80° C. | 12 hours | 8 |
| Comparative Example 11 | 200° C. | 10 minutes | 8 |
| Comparative Example 12 | 200° C. | 12 hours | 9 |
| Comparative Example 13 | 300° C. | 10 minutes | 6 |
| Comparative Example 14 | 300° C. | 12 hours | 8 |
| Comparative Example 15 | 400° C. | 10 minutes | 9 |
| Comparative Example 16 | 400° C. | 12 hours | 10 |
| Comparative Example 17 | 420° C. | 10 minutes | 11 |
| Comparative Example 18 | 420° C. | 30 minutes | 9 |
| Comparative Example 19 | 420° C. | 2 hours | 10 |
| Comparative Example 20 | 420° C. | 4 hours | 10 |
| Comparative Example 21 | 420° C. | 8 hours | 12 |
| Comparative Example 22 | 420° C. | 10 hours | 11 |
| Comparative Example 23 | 420° C. | 12 hours | 12 |

EXAMPLE 21

For a glass substrate obtained in the same manner as in Example 1 with the exceptions that heating of the substrate was conducted at 80° C. for 1 hour, and that after the chemical strengthening treatment, the substrate was cleaned with pure water to remove the molten salt, followed by cleaning with a mixed solution of malonic acid, HEDTA and ascorbic acid, pure water, an alkali cleaning solution and pure water in this order, the average number of defects was similarly examined. The results obtained are shown in Table 3 below.

EXAMPLE 22

For a glass substrate obtained in the same manner as in Example 1 with the exceptions that heating of the substrate was conducted at 200° C. for 1 hour, and that after the chemical strengthening treatment, the substrate was cleaned with pure water to remove the molten salt, followed by cleaning with a mixed solution of malonic acid, HEDTA and ascorbic acid, pure water, an alkali cleaning solution and pure water in this order, the average number of defects was similarly examined. The results obtained are shown in Table 3 below.

EXAMPLE 23

For a glass substrate obtained in the same manner as in Example 1 with the exceptions that heating of the substrate was conducted at 300° C. for 1 hour, and that after the chemical strengthening treatment, the substrate was cleaned with pure water to remove the molten salt, followed by cleaning with a mixed solution of malonic acid, HEDTA and ascorbic acid, pure water, an alkali cleaning solution and pure water in this order, the average number of defects was similarly examined. The results obtained are shown in Table 3 below.

EXAMPLE 24

For a glass substrate obtained in the same manner as in Example 1 with the exceptions that heating of the substrate was conducted at 400° C. for 1 hour, and that after the chemical strengthening treatment, the substrate was cleaned with pure water to remove the molten salt, followed by cleaning with a mixed solution of malonic acid, HEDTA and ascorbic acid, pure water, an alkali cleaning solution and pure water in this order, the average number of defects was similarly examined. The results obtained are shown in Table 3 below.

COMPARATIVE EXAMPLE 24

For a glass substrate obtained in the same manner as in Example 1 with the exception that heating of the substrate was conducted at 80° C. for 1 hour, the average number of defects was similarly examined. The results obtained are shown in Table 3 below.

COMPARATIVE EXAMPLE 25

For a glass substrate obtained in the same manner as in Example 1 with the exception that heating of the substrate was conducted at 200° C. for 1 hour, the average number of defects was similarly examined. The results obtained are shown in Table 3 below.

COMPARATIVE EXAMPLE 26

For a glass substrate obtained in the same manner as in Example 1 with the exception that heating of the substrate was conducted at 300° C. for 1 hour, the average number of defects was similarly examined. The results obtained are shown in Table 3 below.

COMPARATIVE EXAMPLE 27

For a glass substrate obtained in the same manner as in Example 1 with the exception that heating of the substrate was conducted at 400° C. for 1 hour, the average number of defects was similarly examined. The results obtained are shown in Table 3 below.

TABLE 3

|  | Oxidation Treatment Temperature | Oxidation Treatment Time | Malonic Acid Cleaning | Number of Defects |
|---|---|---|---|---|
| Example 21 | 80° C. | 1 hour | Conducted | 1 |
| Example 22 | 200° C. | 1 hour | Conducted | 0 |
| Example 23 | 300° C. | 1 hour | Conducted | 1 |
| Example 24 | 400° C. | 1 hour | Conducted | 2 |
| Comparative Example 24 | 80° C. | 1 hour | Not conducted | 4 |
| Comparative Example 25 | 200° C. | 1 hour | Not conducted | 4 |
| Comparative Example 26 | 300° C. | 1 hour | Not conducted | 3 |
| Comparative Example 27 | 400° C. | 1 hour | Not conducted | 5 |

The results of Examples 1 to 20 and Comparative Examples 2 to 23 are shown in Table 4. The case that the average number of defects is 0-2 is indicated by ◯, the case that the average number of defects is 3-5 is indicated by Δ, and the case that the average number of defects is 6 or more is indicated by X.

TABLE 4

| Heating | Heating Time | | | | | | |
|---|---|---|---|---|---|---|---|
| Temp. | 10 min | 30 min | 2 hrs | 4 hrs | 8 hrs | 10 hrs | 12 hrs |
| 50° C. | X | X | X | X | X | X | X |
| 80° C. | X | Δ | Δ | ◯ | Δ | Δ | X |
| 200° C. | X | Δ | ◯ | ◯ | Δ | Δ | X |
| 300° C. | X | Δ | ◯ | ◯ | Δ | Δ | X |
| 400° C. | X | Δ | Δ | Δ | Δ | Δ | X |
| 420° C. | X | X | X | X | X | X | X |

The results of Examples 21 to 24 and Comparative Examples 24 to 27 are shown in Table 5. The case that the average number of defects is 0-2 is indicated by ◯, the case that the average number of defects is 3-5 is indicated by Δ, and the case that the average number of defects is 6 or more is indicated by X.

TABLE 5

| | Cleaning with Malonic Acid-Containing Agent | |
|---|---|---|
| Oxidation Treatment Conditions | Conducted | Not Conducted |
| Heating at 80° C. for 1 hour | ◯ | Δ |
| Heating at 200° C. for 1 hour | ◯ | Δ |
| Heating at 300° C. for 1 hour | ◯ | Δ |
| Heating at 400° C. for 1 hour | ◯ | Δ |

EXAMPLE 25

The surface of the disk-shaped glass substrate obtained in Example 21 was measured under an atomic force microscope (AFM). As a result, the average roughness Ra was 0.3 nm, and the maximum roughness Rmax was 3 nm. This substrate surface was covered continuously with a chromium alloy undercoat film, a magnetic film containing cobalt as a main component and a carbon protective film by the sputtering method, and a perfluorocarbon-based lubricant was further applied onto the protective film to prepare a magnetic recording medium. As the limit value of the flying height of a magnetic head on this magnetic recording medium, the touch down height (TDH) was measured. As a result, a low flying characteristic of 2 nm was obtained.

According to the method for producing the chemically strengthened glass of the invention, oxidation of the iron-containing particles adhering before the strengthening process can prevent the reaction that iron firmly adheres to the glass surface during the strengthening process. Accordingly, the chemically strengthened glass having the surface high in cleanliness can be provided.

Further, according to the production method of the invention, the firm adhesion of the iron-containing particles during the strengthening process can be prevented without new equipment investment, so that the chemically strengthened glass having the surface high in cleanliness can be obtained at low cost.

Furthermore, by strengthening the glass by the method for producing the chemically strengthened glass of the invention, the strengthened glass substrate for the magnetic recording medium can be obtained which does not have foreign matter on the glass substrate, whereby the crush phenomenon of the magnetic head is difficult to occur and low flying necessary for high density recording is possible.

The glass substrate for information recording medium according to the invention can be applied to not only magnetic disks but also optical disks or magneto optical disks.

It should further be apparent to those skilled in the art that various changes in form and detail of the invention as shown and described above may be made. It is intended that such changes be included within the spirit and scope of the claims appended hereto.

This application is based on Japanese Patent Application No. 2002-89719 filed Mar. 27, 2002, the disclosure of which is incorporated herein by reference in its entirety.

What is claimed is:

1. A method for producing a glass substrate for information recording medium, the method comprising the steps of:
   (a) processing a plate-like glass substrate in a doughnut shape;
   (b) grinding the doughnut-shaped glass substrate to smoothen a surface thereof;
   (c) oxidizing metal-containing particles adhered to a surface of the glass substrate by heating in an oxidation atmosphere;
   (d) adding an oxidizing agent to a potassium-containing chemical strengthening treating solution and heating the potassium-containing chemical strengthening treating solution including the oxidizing agent;
   (e) oxidizing iron particles in the potassium-containing chemical strengthening treating solution by pre-heating the chemical strengthening treating solution before immersing the glass substrate in the chemical strengthening treating solution; and
   (f) contacting the glass substrate with the potassium-containing chemical strengthening treating solution.

2. The method as claimed in claim 1, wherein the oxidizing (c) is conducted by heating the glass substrate at 80-400° C.

3. The method as claimed in claim 1, wherein the oxidizing (c) is conducted by heating the glass substrate for more than 20 minutes to 10 hours.

4. The method as claimed in claim 1, wherein a cleaning is conducted after the chemical strengthening treatment.

5. The method as claimed in claim 4, wherein the cleaning is conducted with a reducing agent-containing acidic solution.

6. The method as claimed in claim 5, wherein the reducing agent is at least one selected from the group consisting of ascorbic acid and oxalic acid.

7. The method as claimed in claim 5, wherein the acidic solution contains at least one acidic ingredient selected from the group consisting of malonic acid, nitric acid and sulfuric acid.

8. The method as claimed in claim 5, wherein the reducing agent-containing acidic solution contains a chelating agent.

9. The method as claimed in claim 8, wherein the chelating agent is oxalic acid or N-(2-hydroxyethyl)ethylenediaminetriacetic acid.

10. The method as claimed in claim 1, wherein the oxidizing (c) is conducted by heating the surface of the glass substrate.

11. The method as claimed in claim 1, wherein the oxidizing (c) comprises a treatment selected from the group consisting of ozone oxidation, ashing treatment and ultraviolet ray irradiation conducted in the presence of oxygen.

12. The method as claimed in claim 1, wherein the oxidizing (c) is conducted in air.

* * * * *